US008397235B2

(12) United States Patent
Dong et al.

(10) Patent No.: US 8,397,235 B2
(45) Date of Patent: Mar. 12, 2013

(54) USER TOLERANCE BASED SCHEDULING METHOD FOR APERIODIC REAL-TIME TASKS

(75) Inventors: Xuesong Dong, Pleasanton, CA (US); Yang Yu, San Ramon, CA (US); Renwei Li, Fremont, CA (US); Ming Li, Cupertino, CA (US)

(73) Assignee: Futurewei Technologies, Inc., Plano, TX (US)

( * ) Notice: Subject to any disclaimer, the term of this patent is extended or adjusted under 35 U.S.C. 154(b) by 726 days.

(21) Appl. No.: 12/573,994

(22) Filed: Oct. 6, 2009

(65) Prior Publication Data

US 2010/0088706 A1 Apr. 8, 2010

Related U.S. Application Data

(60) Provisional application No. 61/103,476, filed on Oct. 7, 2008.

(51) Int. Cl.
*G06F 9/44* (2006.01)
(52) U.S. Cl. ............... 718/100; 718/102; 718/103
(58) Field of Classification Search .................. None
See application file for complete search history.

(56) References Cited

U.S. PATENT DOCUMENTS 7,996,843 B2 * 8/2011 Van Der Veen ............... 718/104

FOREIGN PATENT DOCUMENTS

JP 20050190238 * 12/2003

OTHER PUBLICATIONS

Isovic et al., "Efficient Schedulign of Sporadic, Aperiodic, and Periodic Tasks with Complex Constraints", 2000, IEEE, p. 207-216.*
Choi et al. "Scheduling Aperiodic and Sporadic Tasks in Hard Real-Time Systems", May 7, 1997.*
Zuberi et al., "Non-Preemptive Scheduling of Messages on Controller Area Network for Real-Time Control Applications", 1999, IEEE, p. 240-249.*
Lou et al., "Power-Conscious Joint Scheduling for Periodic Task Graphs and Aperiodic Tasks in Distributed Real-time Embedded Systems", 2000, ICCAD.*
Andersson, B., "Static-Priority Scheduling on Multiprocessors", PhD Thesis, Dept. of Computer Engineering, Chalmers University of Technology, Goteborg, Sweden, 2003.
Baruah, S., et al., "On the Competitiveness of On-Line Real-Time Task Scheduling", Proceedings of the Real-Time Systems Symposium, pp. 106-115, San Antonio, Texas, Dec. 1991.
Baruah, S., et al., "Proportionate Progress: A Notion of Fairness in Resource Allocation", Algorithmica, 15:600-625, 1996.
Srinivsan, Anand, et al., "Fair Scheduling of Dynamic Task Systems on Multiprocessors", Journal of Systems and Software Archive, vol. 77, Issue 1, pp. 67-80, Jul. 2005.

* cited by examiner

*Primary Examiner* — Qing Wu
(74) *Attorney, Agent, or Firm* — Conley Rose, P.C.; Grant Rodolph; Ryan L. Lobato (57) ABSTRACT

An apparatus comprising at least one processor configured to implement a method comprising analyzing a plurality of tasks, determining a privilege level for each of the task, determining a schedule for each of the tasks, and scheduling the tasks for execution based on the privilege level and the schedule of each task. Included is a memory comprising instructions for determining a privilege level for each of a plurality of tasks, wherein the privilege levels comprise periodic real-time, aperiodic real-time, and non-real time, determining an execution time for each of the tasks, and scheduling the tasks for execution on a processor based on the privilege level and the execution time of each task.

20 Claims, 7 Drawing Sheets

USER TOLERANCE BASED SCHEDULING METHOD FOR APERIODIC REAL-TIME TASKS

CROSS-REFERENCE TO RELATED APPLICATIONS

The present application claims priority to U.S. Provisional Patent Application 61/103,476, filed Oct. 7, 2008 by Xuesong Dong, Yang Yu, Renwei Li, and Ming Li, and entitled "User Tolerance Based Scheduling Method for Aperiodic Real-Time Tasks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

There are numerous devices in the market that use real-time operating systems. The operating systems may generally be divided into hard real-time systems and soft real-time systems. Soft real-time systems, such as BSD, LINUX, VXWORKS, and SOLARIS, typically use priority-based scheduling to schedule the tasks, which may be done on a preemptive or non-preemptive basis. In preemptive systems, a thread is forcibly removed from a processor when the timeslot for the thread expires. In non-preemptive systems, threads run a predetermined time and then yield and go to the end of the queue. These models are not precise and may potentially cause deadline misses. Other newly developed methods, for example, EDF, pfair, etc., are too complicated and deemed impractical.

SUMMARY

In one embodiment, the disclosure includes an apparatus comprising at least one processor configured to implement a method comprising analyzing a plurality of tasks, determining a privilege level for each of the task, determining a schedule for each of the tasks, and scheduling the tasks for execution based on the privilege level and the schedule of each task.

In another embodiment, the disclosure includes a system comprising a processor, a plurality of tasks for execution on the processor, at least one run queue comprising an arrangement and specified timing of the tasks for execution by the processor, and a scheduler configured to classify each of the plurality of tasks as one of a periodic task, an aperiodic task, and a non-real time task, determine an execution time and a latest start time for each of the tasks, and determine an order in which the tasks are arranged in the at least one run queue based on the classification of the tasks, the execution time of the tasks and the latest start time for the tasks.

In a third embodiment, the disclosure includes a memory comprising instructions for determining a privilege level for each of a plurality of tasks, wherein the privilege levels comprise periodic real-time, aperiodic real-time, and non-real time, determining an execution time for each of the tasks, and scheduling the tasks for execution on a processor based on the privilege level and the execution time of each task.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It may be understood at the outset that although an illustrative implementation of one or more embodiments are provided below, the disclosed systems and/or methods may be implemented using any number of techniques, whether currently known or in existence. The disclosure may in no way be limited to the illustrative implementations, drawings, and techniques illustrated below, including the exemplary designs and implementations illustrated and described herein, but may be modified within the scope of the appended claims along with their full scope of equivalents.

Described herein is a method and system for scheduling real-time tasks in one or more processors. The scheduling system allows a user to specify the thread time tolerance associated with a thread, which allows the scheduler to more intelligently decide when to schedule threads on the processor.

Figure 1:
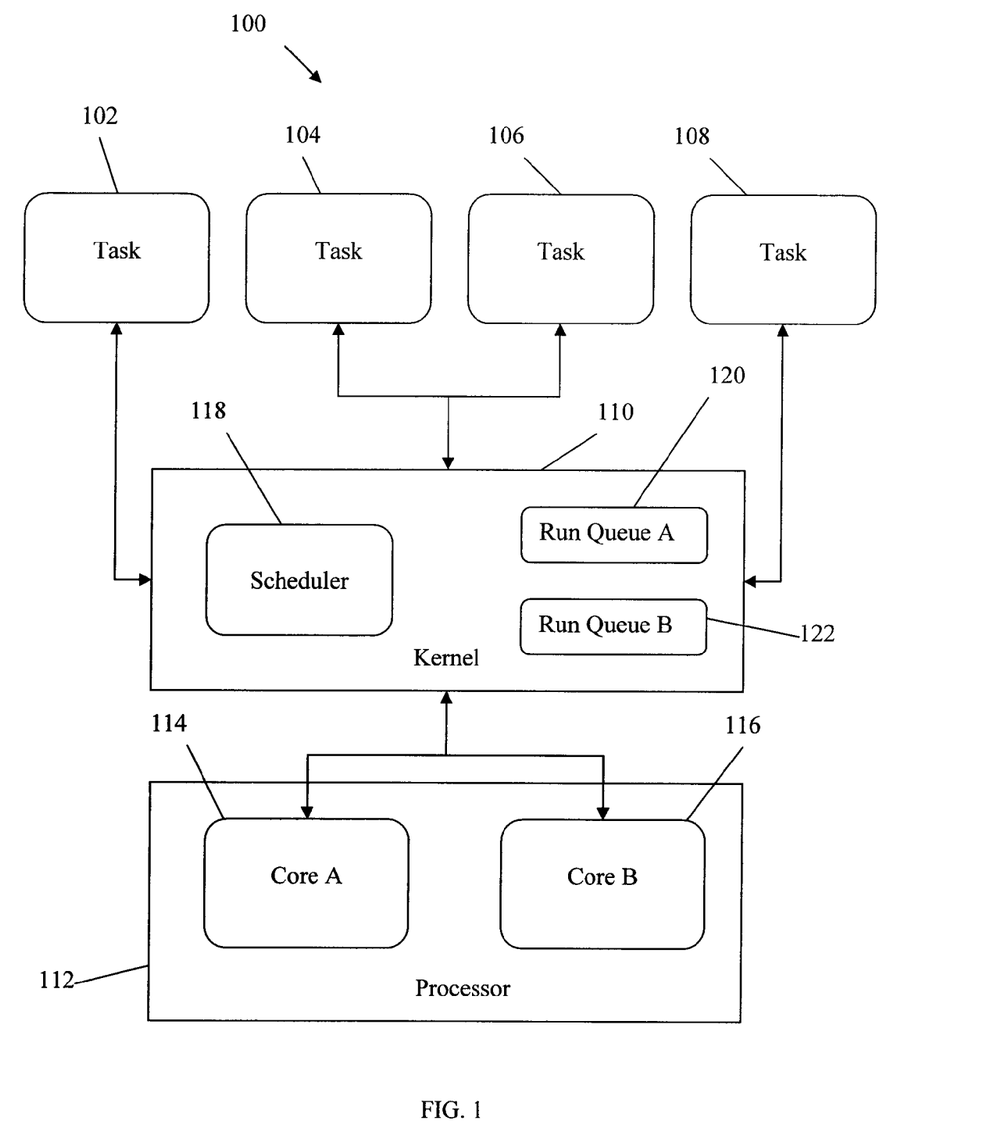
FIG. 1 is a schematic diagram illustrating one embodiment of a system for scheduling tasks in a multi-tasking computer system.

FIG. 1 is a schematic diagram illustrating one embodiment of a system 100 for scheduling tasks in a multi-tasking computer system. The system 100 includes a plurality of tasks 102, 104, 106, 108 to be executed by at least one processor 112. The processor 112 may include any number of processing cores 114, 116, for example two processing cores, Core A 114 and Core B 116, are illustrated in FIG. 1. The system 100 also includes a kernel 110 that may receive the tasks 102, 104, 106, 108 and schedules each task 102, 104, 106, 108 for execution on one of the processing cores 114, 116.

The kernel 110 may include a scheduler 118. The kernel 110 may also include at least one run queue, for example Run Queue A 120 and Run Queue B 122 are illustrated in FIG. 1. Run Queue A 120 may contain jobs for execution on Core A 114 and Run Queue B 122 may contain jobs for execution on Core B 116. The scheduler 118 may determine whether to place each of tasks 102, 104, 106, 108 in Run Queue A 120 or Run Queue B 122. The scheduler 118 may also determine the order that each task 102, 104, 106, 108 may be placed in the respective queue. To efficiently use processing time, the scheduler 118 classifies each of tasks 102, 104, 106, 108 into categories, such as non-real-time tasks, aperiodic tasks, and periodic tasks, and uses these categories to determine the order in which to place tasks 102, 104, 106, 108 into one of Run Queue A 120 and Run Queue B 122. The scheduler 118 may also determine the execution time for each task 102, 104, 106, 108 and the expiration time for each task 102, 104, 106, 108. The execution time may be defined as the duration of time that the task uses the processor before the task is complete. The expiration time may be defined as the time by which the task must begin to run or the time by which the task must be completed. The scheduler may compute the expiration times or they may be included with the tasks when the scheduler receives the tasks. In some embodiments, the expiration time may also be referred to as the yield time.

Non-real-time (NRT) tasks may be defined as tasks with no time constraints. Typically, most of the threads in the router may be NRT tasks. Since NRT tasks may not have any time constraints, these tasks may have lower privilege level than aperiodic tasks and periodic tasks. A such, NRT tasks may run in a first-in, first-out (FIFO) order and may be run to completion before quantum expiry. NRT tasks may be preempted by the other two types of tasks (e.g. aperiodic and periodic tasks). The quantum for an NRT task may be long enough to allow most of the code for the task to finish without calling yield to another task. The scheduler 118 may schedule NRT tasks to run when no expiration is imminent for another higher privilege level task. In an embodiment, the quantum may be the amount of processor time allocated to a task.

Figure 4A:
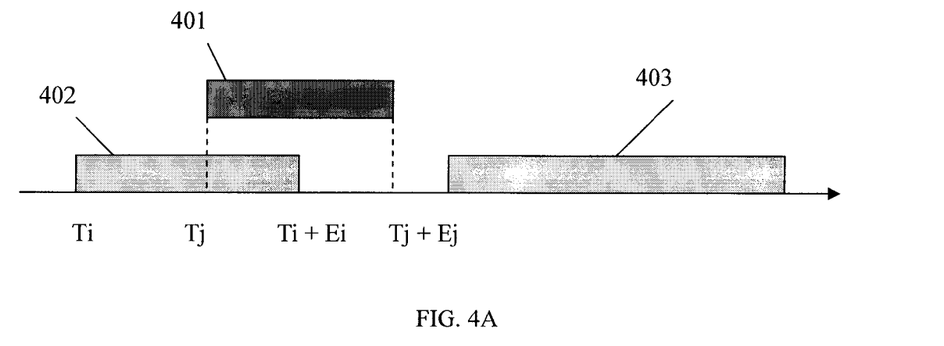
FIGS. 4A and 4B are schematic scheduling diagrams illustrating cases in which a task cannot be scheduled in a run queue.
Figure 4B:
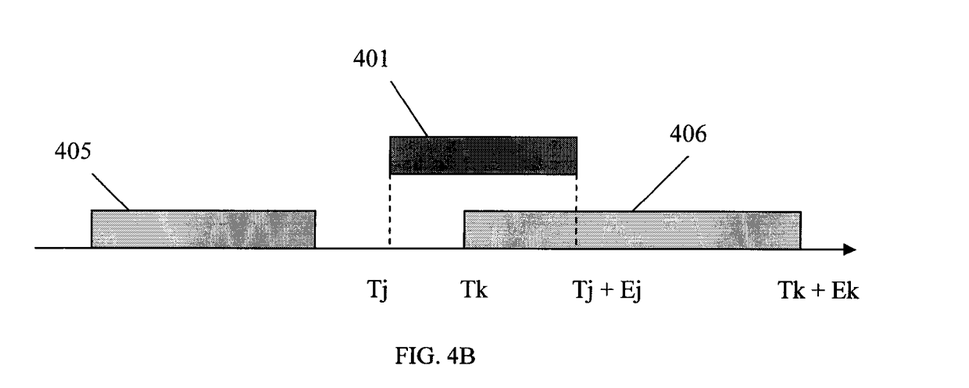

Aperiodic tasks may be tasks that have time constraints defining the time period in which the task must execute. Aperiodic tasks may have a higher privilege level than NRT tasks, but a lower privilege level than are periodic tasks. Aperiodic tasks are typically soft real-time tasks, such as routing protocols. Execution time of an aperiodic task may vary with each run. Aperiodic tasks run to completion when the yield time is before the quantum expiry time. The scheduler 118 may preempt NRT tasks to schedule an aperiodic task. With the execution time Ei and expiration time Ti, the scheduler 118 may schedule a newly arriving aperiodic task according to the capacity of the run queues 120, 122. A run queue has no capacity for a new task j with start time Tj and execution time Ej if there exists a task i in the queue with (Ti, Ei) in which Ti<Tj<Ti+Ei as illustrated in FIG. 4A. In that case, the task j 401 needs to begin before the previous task 402 has completed even though the task j 401 may complete before it is time for task 403 to begin. A run queue also has no capacity for a new task j 401 with start time Tj and execution time Ej if there exists a task k 406 in the queue with (Tk, Ek) where Tk<Tj+Ej<Tk+Ek as illustrated in FIG. 4B, since the task j will not complete until time Tj+Ej (the start time plus the execution time) which is after the time Tk at which task k 406 must begin executing. This may be true even though the start time Tj for task j 401 is after the completion of task 405.

Figure 5:
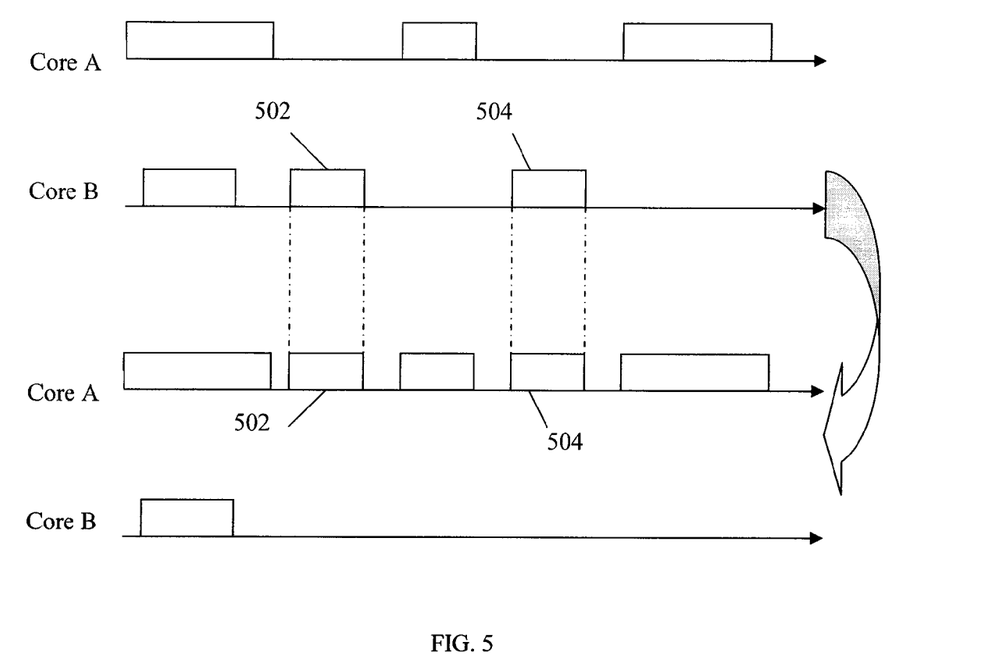
FIG. 5 is a schematic diagram illustrating defragmenting and migrating tasks from one run queue to another run queue.

If a task 102, 104, 106, 108 is not schedulable on one of the cores 114, 116, then the scheduler 118 moves the task 102, 104, 106, 108 to another one of the cores 114, 116. If none of the cores 114, 116 have the capacity for the task 102, 104, 106, 108, the scheduler 118 may run a defragmentation on at least one of the cores 114, 116 so that the cores' processing time is more efficiently used, thereby freeing time on at least one of the cores. An example of such is depicted in FIG. 5, which illustrates the rescheduling of tasks 502 and 504 from the queue for core B 116 to the queue for core A 114, which frees processor time on core B 116 for scheduling other tasks. If after defragmenting the cores 114, 116 none of the cores have sufficient capacity for the desired task 102, 104, 106, 108, the system limit for the task 102, 104, 106, 108 has been reached. The scheduler 118 may then add the task 102, 104, 106, 108 to whichever Run Queue 120, 122 has the earliest fit, and may log a warning to indicate the task 102, 104, 106, 108 is delayed and indicate how long the delay is for. If a number of constraint misses exceeds a specified threshold, the scheduler 118 may readjust the queues 120, 122 and migrate tasks 102, 104, 106, 108 to any other cores 114, 116 that have capacity.

An upper time limit may be specified for a task by the application creating the task at thread creation to indicate the delay within which the thread has to run after being wakened. When a thread is wakened and added to a run queue 120, 122 by the scheduler 118, the scheduler 118 uses this upper limit to put the task in the right place in the run queue 120, 122. If no slot is available in a run queue 120, 122 ahead of the upper limit, the scheduler 118 squeezes the task in one of the run queues 120, 122 before the limit, if permitted.

To calculate execution time (Ei), the threads may use thread_may_timeyield and yield only when this time exceeds the predefined CPU time. As a result, once a thread starts yielding, the execution time during each run will be known and almost the same, with the exception that the first run may be different. When the thread is wakened, the execution time for the first run is estimated by scheduler 118, and may be based on the worst execution time for the particular thread. The execution time Ei for the last run before the thread goes to sleep may be longer than actual execution time. The extra time may be spent on executing NRT tasks.

If NRT tasks are not scheduled for a period of time, the scheduler 118 reserves a time slot for these tasks for fairness and to avoid starvation, thereby ensuring that the NRT tasks are also run. When running in the time slots, an NRT task is run from the NRT queue for that particular core 114, 116. These slots may be interleaved among the two cores 114, 116 so that aperiodic tasks may find an available slot.

In some embodiments, an additional argument, delayed start time Tj, may be added to the task 102, 104, 106, 108 to inform the scheduler 118 that the task 102, 104, 106, 108 would like to run at start time Ti, but may be delayed until delayed start time Tj. When the system is busy, the scheduler 118 may delay existing tasks 102, 104, 106, 108 according to the delayed start time.

Periodic tasks may be defined as tasks that are performed periodically, and may have time constraints. Periodic tasks may typically be soft real-time tasks, such as timers. Periodic tasks are often high frequency tasks with fixed execution times. Typically, the execution time is low. The time constraints for periodic tasks are typically less flexible than aperiodic tasks. Thus, periodic tasks have the highest privilege level and the scheduler may preempt both NRT tasks and aperiodic tasks to schedule periodic tasks. It is preferable that the execution time for periodic tasks be small to guarantee soft real-time scheduling of aperiodic tasks. The scheduler 118 may employ an oversight component to enforce task execution quantum and ensure that the quantum for periodic tasks is significantly smaller than that of the NRT tasks and the aperiodic tasks.

Figure 2:
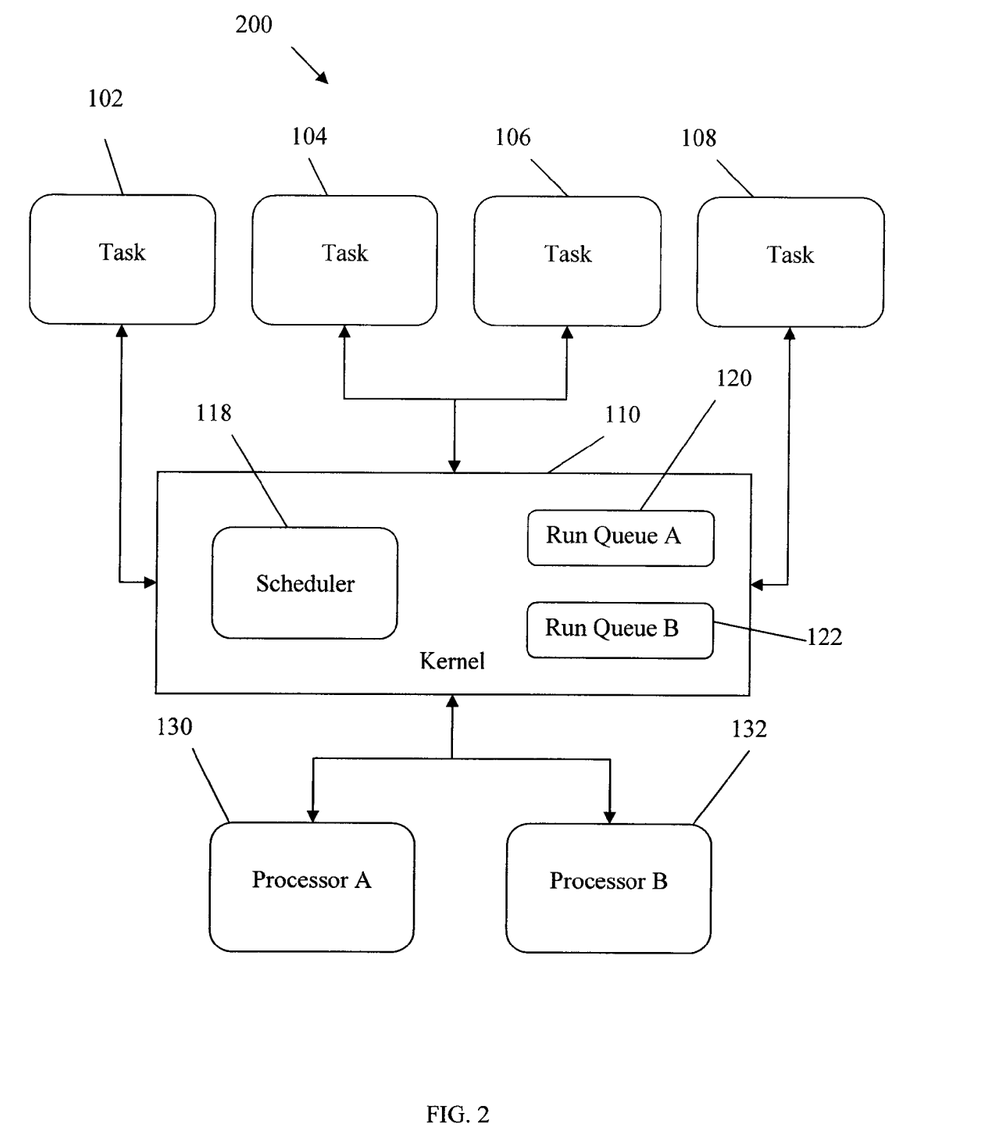
FIG. 2 is a schematic diagram illustrating one embodiment of a system for scheduling tasks in a multi-processor multi-tasking computer system.
Figure 3:
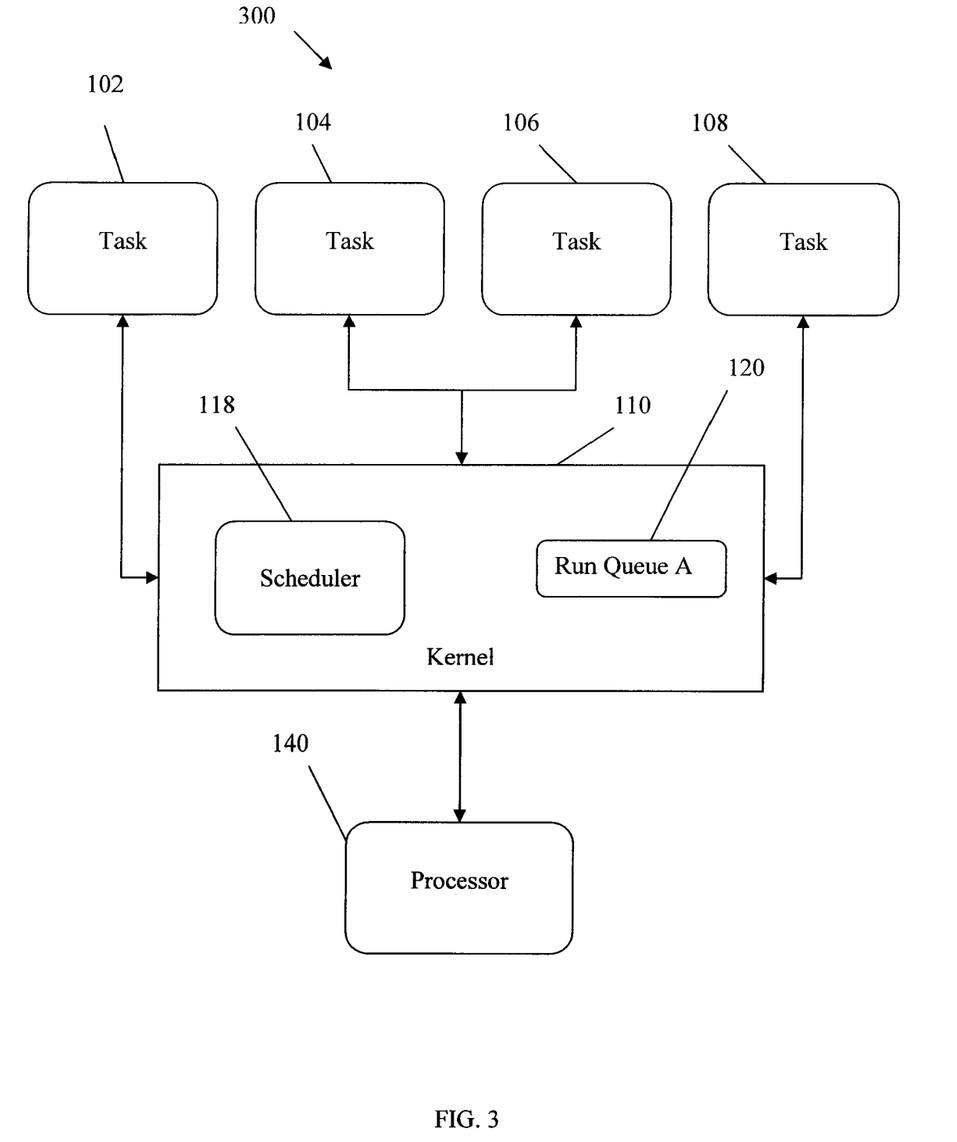
FIG. 3 is a schematic diagram illustrating one embodiment of a system for scheduling tasks in a single-processor multi-tasking computer system.

Although the system has been described with reference to a dual-core processor, the system is not limited to dual core processors, but may be applied to processors of any number of cores. Furthermore, the system is not limited to a single processor, but may be implemented with two or more processors 130, 132 as depicted by system 200 in FIG. 2. Processors 130, 132 may be single core or multi-core processors. Additionally, the system is not limited to multi-core processors or to multi-processor systems, but may be implemented on a single processor such as the processor 140 in system 300 illustrated in FIG. 3.

Kernel 110 and scheduler 118 may be implemented as a computer readable set of instructions stored on a non-transient computer readable storage media and executable by a processor. Run queues 120, 122 may be stored on a non-transient computer readable storage media. Examples of non-transient computer readable storage media include RAM, DRAM, and SDRAM memory components.

In some embodiments, the threads may be required to run to completion and yield before their quantum expires. When the threads yield, a new set of application programming interfaces (APIs) may be used instead of the available thread yield APIs. For example, a new user land thread library API may be used to supply the kernel scheduler with the time Ti that specifies when the task would like to run again, e.g. an expiration time constraint. The new user land thread library API may be embodied as: "int thread_timedyield (const struct timespec*Ti)". The new user land thread library API may allow the scheduler to plan ahead according to user's tolerance. With this API, the threads may yield without leaving the run queue and the scheduler will try to find a slot using Ti.

Another new API may be a wrapper API of thread_timedyield, which may be defined as "thread_may_timedyield (const struct timespec*cpu_tv, const struct timespec*Ti)", and may contain the following pseudocode: "if (thread_time_exceeded(cpu_tv), then thread_timedyield (Ti)". Alternatively, the wrapper API of thread_timedyield may be defined as "thread_timedyield (const struct timespec*Ti, const struct timespec*Tj)" to tell the scheduler that the task would like to run at time Ti but can be delayed up to time Tj. Thread_time_exceeded may determine whether the processor time spent for the thread run exceeds the predefined processor time limit cpu_tv. If it does, the thread calls thread_timedyield to tell the scheduler when it would like to run for the next time. The real-time threads may be required to call thread_may_timedyield so that it can yield after running a fixed amount of time. Hence, the scheduler can predict the execution time for each run accurately based on previous executions. With the execution and expiration time, the scheduler can schedule a yielding task according to its capacity. On a multi-processor system, if the current processor cannot find a slot for this task, the task should be migrated to another processor who has the capacity to accommodate the task. If none of the processors has the capacity, a defragmentation should be triggered among the processors. If still none of the processors has the capacity, the system limit has been reached for the task. The task is added to a processor's run queue that has the earliest fit and a warning should be logged.

A timed yield API can potentially take an additional parameter to allow user threads to specify the absolute maximum time tolerance so that the scheduler can make better decisions on which threads to delay when the system is heavily loaded. When a thread is waken up and added to the run queue, the scheduler can use a predefined user tolerance of time. Aperiodic real-time tasks may preempt non real-time tasks in the system. If there is no imminent expiration for real-time tasks, then non real-time tasks should run. The expiration time constraints of the tasks may be used to order the tasks with a single privilege level. Different time constraint values specified by a thread when yielding causes its execution order to shift at run time achieving the same goal as priority manipulations.

Figure 6:
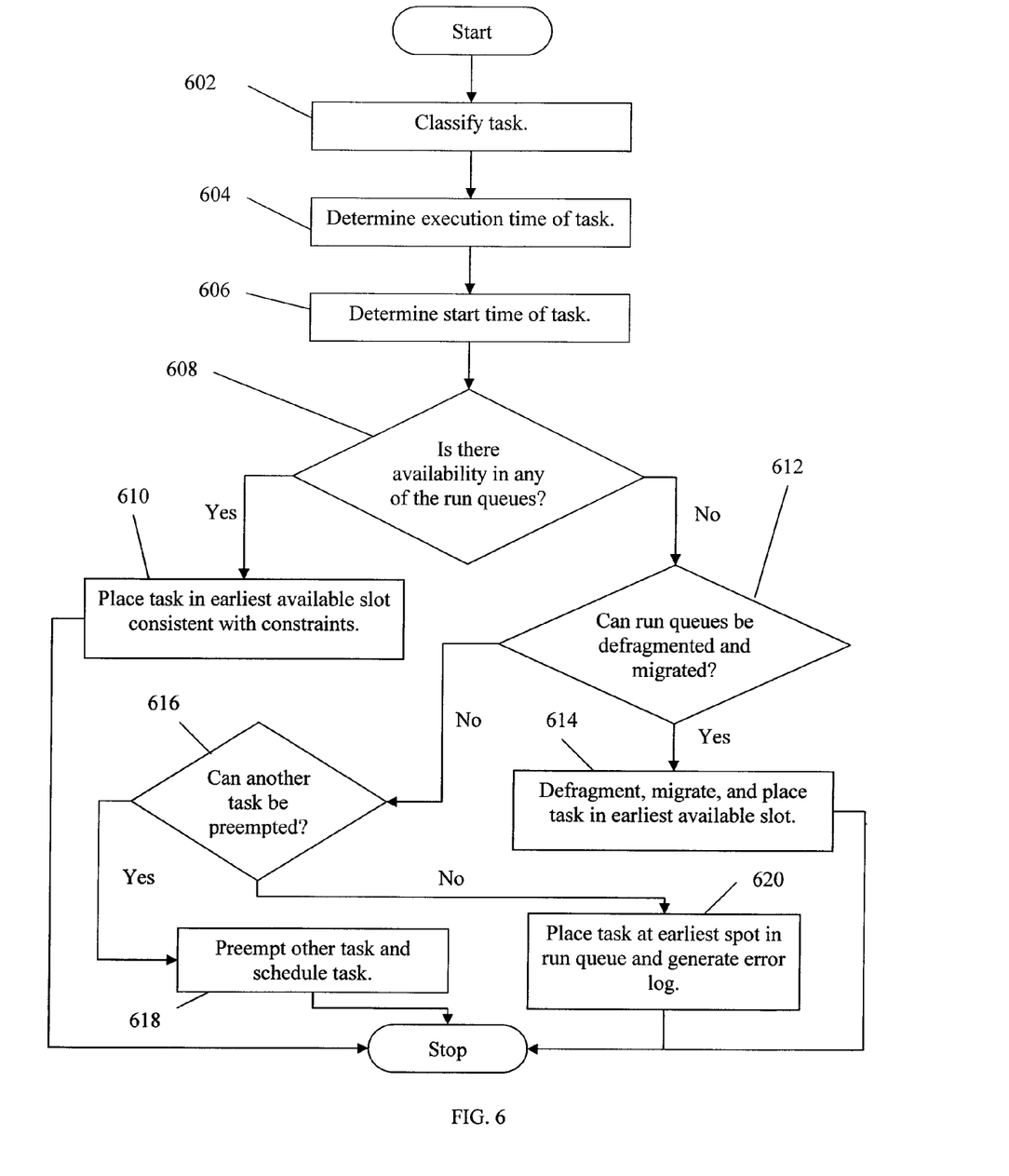
FIG. 6 is a flowchart of an embodiment of a task scheduler in a multi-task computer system.

FIG. 6 is a flowchart of an embodiment of a task scheduler in a multi-task computer system. At block 602, the system receives the task and classifies the task as either a NRT task, an aperiodic task, or a periodic task. At block 604, the system determines the execution time of the task. At block 606, the system determines the start time of the task. In some embodiments, the system may also determine a delayed start time of the task. At block 608, the system determines whether any of the run queues has availability consistent with the constraints imposed by the execution time and the start time of the task. If a run queue does have availability consistent with the constraints, then at block 610 the scheduler places the task in the earliest position in the run queue consistent with the constraints.

If no run queue has availability consistent with the constraints of the task, then at block 612 the scheduler determines whether the run queues may be defragmented and other tasks migrated from one run queue to another run queue to make room for the task. If the run queues may be defragmented, then at block 614, the scheduler defragments the run queues and moves selected ones of the other tasks from one queue to another queue, and places the task in the earliest available slot in one of the run queues that is consistent with the constraints imposed on the task. If, however, the run queues cannot be defragmented, then at block 616 the scheduler determines whether one of the existing tasks may be preempted and moved to another place in the queue. If one or more tasks may be preempted, then at block 618 the scheduler moves the preempted tasks to another position in the run queue and places the task in the position of the preempted task(s). If no tasks may be preempted, then at block 620 the scheduler places the task at the earliest available position in the run queues and logs an error in an error log indicating that the task has been delayed and the amount of time that the task is delayed.

The systems and methods disclosed herein offer numerous advantages over preemption based scheduling. For example, developers do not have to play with conceptual numbers like priorities and may use time constraints which are native to routing protocols. Depending on embodiments, the scheduling of a task may largely be determined by two or three parameters—start time Ti, execution time Ei, and delayed start time Tj—rather than the numerous (e.g. tens or hundreds) of priorities used in priority-based scheduling methods. The disclosed systems and methods provide high predictability on multiprocessor systems. Furthermore, the disclosed systems and methods provide that high privilege level new tasks may run with reasonable delay if desired.

Figure 7:
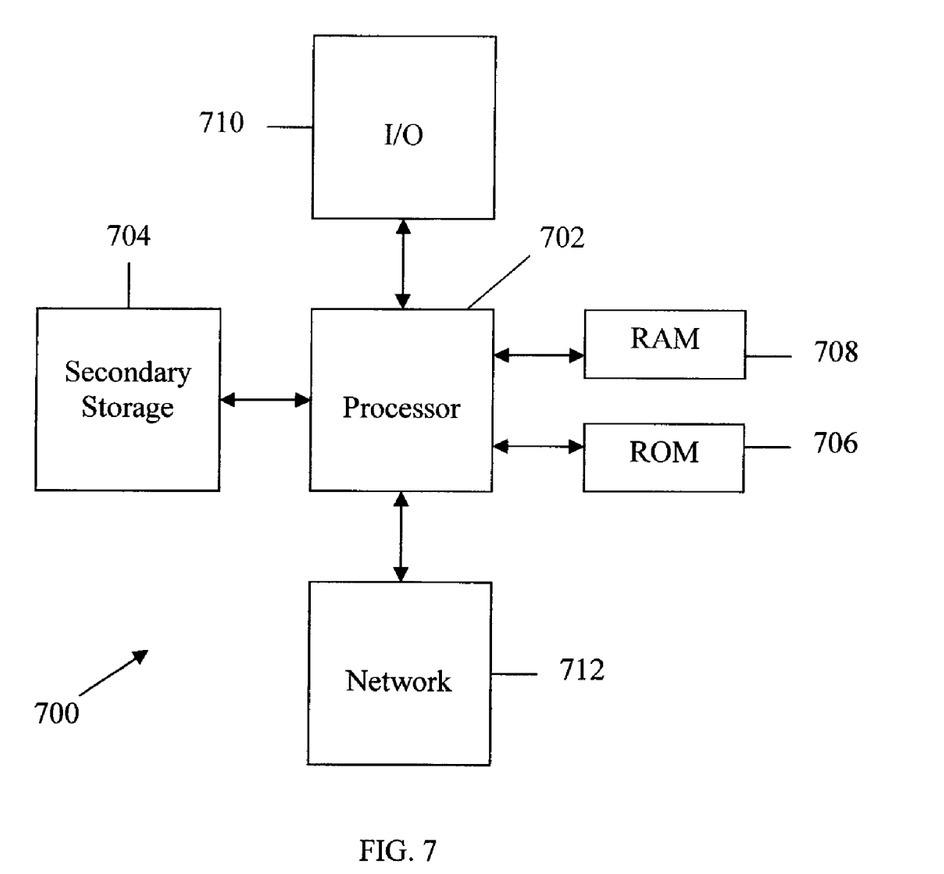
FIG. 7 illustrates an embodiment of a network component.

The network components described above may be implemented on any general-purpose network component, such as a computer or network component with sufficient processing power, memory resources, and network throughput capability to handle the necessary workload placed upon it. FIG. 7 illustrates a typical, general-purpose network component 700 suitable for implementing one or more embodiments of the components disclosed herein. The network component 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips, or may be part of one or more application specific integrated circuits (ASICs).

The secondary storage 704 is typically comprised of one or more disk drives or tape drives and is used for non-volatile storage of data and as an over-flow data storage device if RAM 708 is not large enough to hold all working data. Secondary storage 704 may be used to store programs that are loaded into RAM 708 when such programs are selected for execution. The ROM 706 is used to store instructions and perhaps data that are read during program execution. ROM 706 is a non-volatile memory device that typically has a small memory capacity relative to the larger memory capacity of secondary storage 704. The RAM 708 is used to store volatile data and perhaps to store instructions. Access to both ROM 706 and RAM 708 is typically faster than to secondary storage 704.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising:
at least one processor configured to:
analyze a plurality of tasks;
determine a privilege level for each of the tasks;
determine a start time and a tolerance time for each of the tasks;
determine a schedule for each of the tasks;
schedule the tasks for execution based on the privilege level and the schedule of each task; and
place a selected task in a later slot time in an at least one run queue than is required by a corresponding start time for the selected task when there are no available slots in the at least one run queue that satisfy an execution time and the start time requirements for the selected task.

2. The apparatus of claim 1, wherein the privilege levels comprise periodic real-time, aperiodic real-time, and non-real-time.

3. The apparatus of claim 2, wherein the schedule comprises an execution time.

4. The apparatus of claim 2, wherein the schedule comprises a yield time.

5. The apparatus of claim 2, wherein at least some of the tasks having the aperiodic real-time or the non-real-time privilege levels are executed prior to tasks having the periodic real-time privilege level.

6. The apparatus of claim 1, wherein the tasks are executed on a plurality of processing cores.

7. The apparatus of claim 6, wherein the processor is further configured to defragment the processing cores.

8. A system comprising:
a processor;
a plurality of tasks for execution on the processor;
at least one run queue comprising an arrangement and specified timing of the tasks for execution by the processor; and
a scheduler configured to classify each of the plurality of tasks as one of a periodic task, an aperiodic task, and a non-real time task, determine an execution time and a latest start time for each of the tasks, and determine an order in which the tasks are arranged in the at least one run queue based on the classification of the tasks, the execution time of the tasks and the latest start time for the tasks,
wherein the scheduler is further configured to place a selected task in a later slot in the at least one run queue than is required by the corresponding start time for the selected task when there are no available slots in the at least one run queue that satisfy execution time and start time requirements for the selected task.

9. The system of claim 8, wherein the scheduler is further configured to determine a delayed start time for each of the tasks and determine the order in which the tasks are arranged based on the delayed start time for each of the tasks.

10. The system of claim 8, wherein the scheduler is further configured to preempt non-real time tasks to schedule one of an aperiodic task and a periodic task such that the one of the aperiodic task and the periodic task executes consistent with constraints imposed by the execution time and the start time for the one of the aperiodic task and the periodic task.

11. The system of claim 8, wherein the processor comprises at least two processors.

12. The system of claim 8, wherein the processor comprises a multi-core processor.

13. The system of claim 8, wherein a thread for one of the tasks may yield to another task in the run queue without leaving the run queue.

14. A system comprising:
a processor;
a plurality of tasks for execution on the processor;
at least one run queue comprising an arrangement and specified timing of the tasks for execution by the processor; and
a scheduler configured to classify each of the plurality of tasks as one of a periodic task, an aperiodic task, and a non-real time task, determine an execution time and a latest start time for each of the tasks, and determine an order in which the tasks are arranged in the at least one run queue based on the classification of the tasks, the execution time of the tasks and the latest start time for the tasks,
wherein the at least one run queue comprises a first run queue and a second run queue, and
wherein the scheduler is further configured to defragment the first run queue and second run queue and migrate selected ones of previously scheduled tasks from the first run queue to the second run queue.

15. A system comprising:
a processor;
plurality of tasks for execution on the processor;
at least one run queue comprising an arrangement and specified timing of the tasks for execution by the processor; and
a scheduler configured to classify each of the plurality of tasks as one of a periodic task, an aperiodic task, and a non-real time task, determine an execution time and a latest start time for each of the tasks, and determine an order in which the tasks are arranged in the at least one run queue based on the classification of the tasks, the execution time of the tasks and the latest start time for the tasks,
wherein the scheduler is further configured to create an error log indicating that the selected task has been delayed and indicating the amount of time by which the selected task is delayed.

16. A memory comprising instructions for:
determining a privilege level for each of a plurality of tasks, wherein the privilege levels comprise periodic real-time, aperiodic real-time, and non-real time;
determining an execution time for each of the tasks;
determining a start time for each of the tasks, wherein the start time is a preferred start time;
determining a tolerance time for each of the tasks, wherein the tolerance time comprises a time by which the start time of the task may be delayed when the start time is not available; and
scheduling the tasks for execution on a processor based on the privilege level, the execution time, the start time, and the tolerance time of each task.

17. The memory of claim 16, wherein at least some of the tasks having the aperiodic real-time or the non-real-time privilege levels are executed prior to tasks having the periodic real-time privilege level.

18. The memory of claim 16, wherein the tasks are executed on a plurality of processing cores.

19. The memory of claim 18, wherein the instructions further comprise defragmenting the processing cores.

20. A memory comprising instructions for:
determining a privilege level for each of a plurality of tasks, wherein the privilege levels comprise periodic real-time, aperiodic real-time and non-real time;
determining an execution time for each of the tasks; and
scheduling the tasks for execution on a processor based on the privilege level and the execution time of each task,
wherein at least some of the tasks having the periodic real-time privilege level are delayed when no other periodic real-time privilege level tasks are scheduled for execution.

* * * * *

UNITED STATES PATENT AND TRADEMARK OFFICE
CERTIFICATE OF CORRECTION

PATENT NO. : 8,397,235 B2  
APPLICATION NO. : 12/573994  
DATED : March 12, 2013  
INVENTOR(S) : Xuesong Dong et al.

It is certified that error appears in the above-identified patent and that said Letters Patent is hereby corrected as shown below:

In Item 56 - References Cited - OTHER PUBLICATIONS the first entry should read as follows:

Isovic et al., "Efficient Scheduling of Sporadic, Aperiodic, and Periodic Tasks with Complex Constraints", 2000, IEEE, p. 207-216.*

Signed and Sealed this
Fourteenth Day of May, 2013

Teresa Stanek Rea
*Acting Director of the United States Patent and Trademark Office*